United States Patent [19]

Beck

[11] Patent Number: 5,191,137
[45] Date of Patent: Mar. 2, 1993

[54] MOLECULAR SIEVES COATED WITH NON-OXIDE CERAMICS FOR TOLUENE DISPROPORTIONATION

[75] Inventor: Jeffrey S. Beck, Lawrenceville, N.J.

[73] Assignee: Mobil Oil Corp., Fairfax, Va.

[21] Appl. No.: 873,843

[22] Filed: Apr. 27, 1992

Related U.S. Application Data

[63] Continuation-in-part of Ser. No. 650,109, Feb. 4, 1991, Pat. No. 5,120,692.

[51] Int. Cl.$^5$ .......................... C07C 5/52; B01J 29/04
[52] U.S. Cl. ...................................... 585/475; 208/114; 208/119; 208/120; 585/415; 585/417; 585/444; 585/446; 585/467; 585/470; 585/480; 585/481; 585/640; 585/654
[58] Field of Search ............... 585/475, 415, 417, 444, 585/446, 467, 470, 480, 481, 640, 654

[56] References Cited

U.S. PATENT DOCUMENTS

| | | | |
|---|---|---|---|
| 2,885,368 | 5/1959 | Hess et al. | 252/428 |
| 3,181,231 | 5/1965 | Breck | 29/182.5 |
| 3,210,267 | 10/1965 | Plank et al. | 208/120 |
| 3,723,351 | 3/1973 | Flank et al. | 252/454 |
| 4,465,886 | 8/1984 | Rodewald | 585/475 |
| 4,709,110 | 11/1987 | Rodewald | 585/475 |
| 4,801,439 | 1/1989 | Blum et al. | 423/284 |
| 4,810,436 | 3/1989 | Johnson | 264/29.1 |
| 4,810,685 | 3/1989 | Twigg et al. | 502/60 |
| 4,832,895 | 5/1989 | Johnson | 264/29.1 |
| 4,833,103 | 5/1989 | Agostinelli et al. | 437/231 |
| 4,851,604 | 7/1989 | Absil et al. | 585/475 |
| 5,120,692 | 6/1992 | Beck | 502/60 |

FOREIGN PATENT DOCUMENTS

0224992 10/1987 European Pat. Off.

OTHER PUBLICATIONS

Fazen, P. et al., "Thermally Induced Borazine Dehydropolymerization Reactions Synthesis and Ceramic Conversion Reactions of a New High-Yield Polymeric Precursor to Boron Nitride," Chemistry of Materials, 2, 96–97 (1990).

Peuckert, M. et al., "Ceramics from Organometallic Polymers," Advanced Materials, 2, No. 9, 398–404, (1990).

*Primary Examiner*—Carl F. Dees
*Attorney, Agent, or Firm*—Alexander J. McKillop; Charles J. Speciale; Edward F. Kenehan, Jr.

[57] ABSTRACT

There is provided a molecular sieve coated with a non-oxide ceramic. The molecular sieve may be a zeolite, such as ZSM-5, and the ceramic coating may be, e.g., boron nitride. The coated molecular sieve may be prepared by contacting the molecular sieve with a ceramic precursor material comprising a thermally decomposable material, such as polyborazylene, and thermally decomposing this thermally decomposable material. The coated molecular sieves may be used as organic conversion catalysts. The non-oxide ceramic coating may alter or enhance the shape-selective properties of the molecular sieve by providing a diffusion barrier to molecules.

10 Claims, No Drawings

MOLECULAR SIEVES COATED WITH NON-OXIDE CERAMICS FOR TOLUENE DISPROPORTIONATION

CROSS-REFERENCE TO RELATED APPLICATION

This application is a continuation-in-part of copending U.S. application Ser. No. 07/650,109, filed Feb. 4, 1991, now U.S. Pat. No. 5,120,692 the entire disclosure of which is expressly incorporated herein by reference.

BACKGROUND

There is provided a molecular sieve, such as a zeolite, coated with a ceramic, such as a boron nitride. There is also provided a method for making these materials. There is also provided a process for using these materials, e.g., as catalysts.

Zeolite materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are included in the class of materials known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolite have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The $SiO_2/Al_2O_3$ mole ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to infinity. U.S. Pat. No. 3,941,871 (Re. 29,948) discloses a porous crystalline silicate made from a reaction mixture containing no deliberately added alumina in the recipe and exhibiting the X-ray diffraction pattern characteristics of ZSM-5 type zeolites. U.S. Pat. Nos. 4,061,724; 4,073,865 and 4,104,294 describe crystalline silicates or organosilicates of varying alumina and metal content.

A number of synthetic zeolites have been prepared which may be said to be isostructural with naturally occurring zeolites. Zeolites ZSM-35 and ZSM-38 are, for instance, ferrierite-type zeolites. Zeolite ZK-20 (U.S. Pat. No. 3,459,676) is described as being isostructural with the naturally occurring zeolite levynite.

Although zeolites include materials containing silica and alumina, it is recognized that the silica and alumina portions may be replaced in whole or in part with other oxides. More particularly, $GeO_2$ is an art recognized substitute for $SiO_2$ and $B_2O_3$, $Cr_2O_3$, $Fe_2O_3$ and $Ga_2O_3$ are art recognized replacements for $Al_2O_3$. Accordingly, the term zeolite as used herein shall connote not only materials containing silicon and, optionally, aluminum atoms in the crystalline lattice structure thereof, but also materials which contain suitable replacement atoms for such silicon and/or aluminum. On the other hand, the term aluminosilicate zeolite as used herein shall define zeolite materials consisting essentially of silicon and, optionally, aluminum atoms in the crystalline lattice structure thereof, as opposed to materials which contain substantial amounts of suitable replacement atoms for such silicon and/or aluminum.

The entire disclosures of the above-mentioned U.S. patents are expressly incorporated herein by reference.

SUMMARY

According to an aspect of this application, there is provided a molecular sieve material coated with a non-oxide ceramic.

According to another aspect of this application, there is provided a method for preparing a coated molecular sieve material, said method comprising the steps of:
  (i) contacting a molecular sieve with a ceramic precursor material, said ceramic precursor material being capable of being converted into a non-oxide ceramic coating; and
  (ii) converting the precursor material of step (i), whereby a non-oxide ceramic coating is formed on said molecular sieve.

According to another aspect of this application, there is provided a process for converting an organic, said process comprising contacting said organic with a catalyst comprising a molecular sieve coated with a non-oxide ceramic.

EMBODIMENTS

Although molecular sieves are exemplified herein primarily as zeolites, it will be understood that the present invention pertains to other forms of molecular sieves including amorphous, as well as crystalline, materials. Such molecular sieves include activated carbon, amorphous aluminosilicates, aluminophosphates as described in U.S. Pat. Nos. 4,310,440 and 4,385,994, silicoaluminophosphates (SAPOs) as described in U.S.

Pat. No. 4,440,871, ELAPSOs as described in U.S. Pat. Nos. 4,704,478 and 4,701,562, MeAPOs as described in U.S. Pat. No. 4,567,029, FeAPOs as described in U.S. Pat. No. 4,554,143, TAPOs as described in U.S. Pat. No. 4,500,651, FCAPOs as described in U.S. Pat. No. 4,686,093 and layered materials as described in U.S. Pat. No. 4,859,648.

The molecular sieve may also be coated by contacting the molecular sieve with a material which is capable of thermally decomposing to form a non-oxide ceramic material, followed by heating the contacted material to a temperature sufficient to decompose the thermally decomposable material. When the molecular sieve is coated in this manner, the molecular sieve should be a material which is thermally stable under these heating conditions.

Various ceramic precursors are described in U.S. Pat. Nos. 4,801,439; 4,810,436; 4,832,895; and 4,833,103. A particluar ceramic precursor comprises polyborazylene $(B_3N_3H_4)_x$ which is described in the article by P. F. Fazen, J. S. Beck, A. T. Lynch, E. R. Remsen, and L. G. Sneddon, Chemistry of Materials 1990, Volume 2, pgs. 96–97. Ceramic precursors may be either monomeric or polymeric thermally decomposable materials, and these ceramic precursors may optionally comprise solvents for the thermally decomposable materials.

The molecular sieve may also be coated by contacting the molecular sieve with a dispersion of a non-oxide ceramic, such as BN, in an organic media, followed by evaporation of the organic media. In this instance the dispersion of the non-oxide ceramic in the organic media may be considered to be the ceramic precursor. This dispersion may be, for example, a colloidal dispersion.

Non-oxide ceramics which may be coated on molecular sieves include borides, carbides, nitrides, phosphides and silicides. Examples of such ceramics include BN, BNC, AlN, GaN, BP, $B_4C$, $TiB_2$, $Si_3N_4$ and SiC. In addition to polyborazylene, examples of thermally decomposable materials which are ceramic precursors include $(CH_3)_2S:BHBr_2$, $(CH_3)_3N:AlH_3$, $NH_3:BH_3$, $Al(BH_4)_3$, $(CH_3)_2SiCl_2$, and $(CH_3)HSiCl_2$.

In general, polymeric thermally decomposable materials include polyvinylpentaborane, polyvinylborazine, polycarbosilanes, polysilanes, polycarbosiloxanes, polysilazanes and polycarborane siloxanes. In general, molecular thermally decomposable materials include aluminum amides, borazines, base-boranes, base-alanes, base-gallanes and silanes.

In order to accomplish thermal decomposition, it may be necessary to use a decomposition gas during thermal treatment. For example, the molecular species $(CH_3)_2 S:BHBr_2$ will decompose to BN only if the decomposition is carried out under ammonia. Examples of appropriate decomposition gases, which may be used with certain thermally decomposable materials, include $N_2$, Ar, $PH_3$, $NH_3$ and $AsH_3$.

Provided that suitable decomposition gases are used, where necessary, the following polymeric thermally decomposable materials may be converted into the following coatings (the composition of the coating is given in parentheses): polyvinylpentaborane (BN); polyvinylborazine (BN); polycarbosilanes (SiC); polysilanes (SiC); polycarbosiloxanes (SiC); polysilazanes ($Si_3N_4$/Sic); and polycarborane siloxanes ($B_4C$/SiC).

Prior to being contacted with the ceramic precursor, the molecular sieve may be optionally combined with a binder material which is permeable to the ceramic precursor. Depending upon the relative sizes of the molecular sieve pores and the ceramic precursor, the ceramic coating may form primarily on the exterior surface of the molecular sieve or this coating may extend into the interior pore space of the molecular sieve. Without wishing to be bound by any particular theory, it is theoretically possible that in some instances the ceramic coating is bound to the molecular sieve merely by physical interaction between the two species, while in other instances chemical interaction, e.g., in terms of covalent bonding, may take place.

Particular examples of molecular sieves which may be coated with non-oxide ceramics include zeolites having a Constraint Index of from 1 to 12. ZSM-5 is an example of such a zeolite.

Molecular sieves include materials, such as zeolites, having ion exchange capacity. The original alkali metal cations of the as synthesized zeolite can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the zeolite catalytically active, especially for hydrocarbon conversion. Replacing cations include hydrogen, rare earth metals and metals of Groups IA, IIA, IIIA, IVA, IB, IIB, IIIB, IV and VIII of the Periodic Table of the Elements.

A typical ion exchange technique would be to contact the synthetic zeolite with a salt of the desired replacing cation or cations. Examples of such salts include the halides, e.g. chlorides, nitrates and sulfates.

Zeolites can be used either in the alkali metal form, e.g. the sodium or potassium form; the ammonium form; the hydrogen form or another univalent or multivalent cation form. When used as a catalyst the zeolite will be subjected to thermal treatment to remove part or all of the organic constituent.

The coated molecular sieves described herein can be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition to the extent atom Y, e.g., aluminum, is in the structure, impregnated therein or intimately physically admixed therewith. Such component can be impregnated in or on to it such as for example, by, in the case of platinum, treating the coated molecular sieve having ion exchange capacity with a solution containing a platinum metal-containing ion. Thus, suitable platinum compounds include chloroplatinic acid, platinous chloride and various compounds containing the platinum amine complex. The hydrogenating component may also be combined with the molecular sieve prior to the application of the coating of the non-oxide ceramic.

The coated molecular sieve of the present invention, when employed either as an adsorbent or as a catalyst in an organic compound conversion process should usually be dehydrated, at least partially. This can be done by heating to a temperature in the range of 200° C. to 595° C. in an inert atmosphere, such as air, nitrogen, etc. and at atmospheric, subatomspheric or superatmospheric pressures for between 30 minutes and 48 hours. Dehydration can also be performed at room temperature merely by placing the coated molecular sieve in a vacuum, but a longer time is required to obtain a sufficient amount of dehydration.

The coated molecular sieve of the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where a catalyst is molded, such as by extrusion, the catalyst can be extruded before drying or partially dried and then extruded.

In the cases of many catalysts, it is desired to incorporate the catalytic coated molecular sieve with another material resistant to the temperatures and other conditions employed in organic conversion processes. Such materials inlcude active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Use of a material in conjunction with the coated molecular sieve, i.e. combined therewith, which is active, tends to improve the conversion and/or selectivity of the catalyst in certain organic conversion processes. Inactive materials suitably serve as diluents to contrl the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the materials of the present invention include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present material also include inorganic oxides, notably alumina.

In addition to the foregoing materials, the coated molecular sieve of the present invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the coated molecular sieve content ranging from about 1 to about 90 percent by weight and more usually, particularly when the composite is prepared in the form of beads, in the range of about 2 to about 80 weight percent of the composite.

The coated molecular sieve of the present invention when possessing acid activity is useful as a catalyst component for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere, (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 300° C. to about 550° C., more preferably from about 370° C. to about 500° C., a pressure of from about 0.01 psi to about 2000 psi, more preferably from about 0.1 psi to about 500 psi, and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

EXAMPLE

A solution of polyborazylene (0.50 g) in 20 ml of tetrahydrofuran was added to a beaker containing 2.00 g of calcined ZSM-5. It is noted that this ZSM-5 consisted essentially of relatively large crystalllites of the type described in U.S. Pat. No. 4,375,458. The contents were then stirred for 0.5 h. After removing the liquid phase by vacuum evaporation, the dried solids were transferred to a horizontal tube furnace. The sample was heated under nitrogen at 2° C. per minute to a maximum temperature of 600° C.

This coating process reduced the o-xylene diffusion rate ($D/r^2$) for this zeolite from $3.8 \times 10^{-6} \sec^{-1}$ for the uncoated zeolite to $2.1 \times 10^{-7} \sec^{-1}$ for the coated zeolite. However, the ultimate benzene sorption for both the coated and uncoated zeolites was 7 wt. %. Therefore, the coating process established a diffusion barrier without occluding the zeolite pore structure.

When both the coated and uncoated zeolites were used as catalysts to disproportionate toluene, the coated zeolite produced a greater percentage of the paraisomer among the xylenes produced. More particularly, at 1 atm toluene, 900° F. and 4% toluene conversion, the untreated material gave 32.4% paraxylene and the BN treated material gave 73.1% paraxylene.

What is claimed is:

1. A process for converting an organic, said process comprising contacting said organic with a catalyst comprising a molecular sieve coated with a non-oxide ceramic.

2. A process according to claim 1, wherein said molecular sieve coated with a non-oxide ceramic is ZSM-5 coated with BN.

3. A process according to claim 2, wherein toluene is contacted with said ZSM-5 coated with BN under conditions sufficient to disproportionate said toluene.

4. A process according to claim 1, wherein said non-oxide ceramic is selected from the group consisting of borides, carbides, nitrides, phosphides and silicides.

5. A process according to claim 1, wherein said non-oxide ceramic is selected from the group consisting of BN, BNC, AlN, GaN, BP, $B_4C$, $TiB_2$, $Si_3N_4$ and SiC.

6. A process according to claim 1, wherein said non-oxide ceramic is BN.

7. A process according to claim 1, wherein a zeolite is coated with said non-oxide ceramic.

8. A process according to claim 7 wherein said zeolite has a Constraint Index from 1 to 12.

9. A process according to claim 7 wherein said zeolite is ZSM-5.

10. A process according to claim 7, wherein said non-oxide ceramic is BN.

* * * * *